United States Patent
Qian

(10) Patent No.: US 9,509,500 B2
(45) Date of Patent: Nov. 29, 2016

(54) METHOD AND APPARATUS FOR MIGRATING ENCRYPTED DATA

(71) Applicant: HERE Global B.V., Veldhoven (NL)

(72) Inventor: Gaoqiang Qian, Watertown, MA (US)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 14/674,818

(22) Filed: Mar. 31, 2015

(65) Prior Publication Data

US 2016/0294549 A1    Oct. 6, 2016

(51) Int. Cl.
*H04L 9/08*    (2006.01)
*G06F 17/30*    (2006.01)

(52) U.S. Cl.
CPC ........... *H04L 9/0822* (2013.01); *G06F 17/303* (2013.01)

(58) Field of Classification Search
USPC ........................................................ 380/281
See application file for complete search history.

(56) References Cited

U.S. PATENT DOCUMENTS

| | | | |
|---|---|---|---|
| 7,093,137 B1 * | 8/2006 | Sato ..................... | G06F 21/6227 380/277 |
| 7,444,670 B2 | 10/2008 | Berger et al. | |
| 8,229,116 B2 * | 7/2012 | Ogata ................. | H04L 63/0435 380/201 |
| 8,266,433 B1 * | 9/2012 | Przykucki ............... | H04L 63/06 380/286 |
| 8,644,513 B2 * | 2/2014 | Wong .................... | H04L 9/0819 380/256 |
| 8,645,712 B1 * | 2/2014 | Langhammer ........ | H04L 9/0841 713/176 |
| 2004/0165727 A1 * | 8/2004 | Moreh ................. | G06Q 20/401 380/278 |
| 2005/0223216 A1 * | 10/2005 | Chan ..................... | H04L 63/083 713/153 |
| 2008/0066192 A1 * | 3/2008 | Greco ................. | G06F 21/6209 726/32 |
| 2008/0133935 A1 * | 6/2008 | Elovici ............... | G06F 21/6227 713/193 |
| 2008/0228770 A1 | 9/2008 | Halcrow et al. | |
| 2009/0285396 A1 * | 11/2009 | Wong .................... | G06F 17/303 380/277 |
| 2010/0023755 A1 | 1/2010 | Kotani et al. | |
| 2010/0169639 A1 * | 7/2010 | Jeffries ................. | G06Q 10/10 713/153 |
| 2013/0230171 A1 * | 9/2013 | Ivanchykhin ......... | H04L 63/108 380/259 |
| 2013/0232339 A1 * | 9/2013 | Ignatchenko ...... | H04N 21/4623 713/171 |

OTHER PUBLICATIONS

Chetal et al., "Interoperability and Portability", Aug. 22, 2011, retrieved on Jun. 26, 2015 from http://webcache.googleusercontent.com/search?q=cache:YMMX7LFyrYgJ:https://cloudsecurityalliance.org/wp-content/uploads/2011/09/Domain-6.docx+&cd=4&hl=en&ct=clnk&gl=in, 17 Pages.

* cited by examiner

*Primary Examiner* — Amare F Tabor
(74) *Attorney, Agent, or Firm* — Ditthavong & Steiner, P.C.

(57) ABSTRACT

An approach is provided for managing the migration of large amounts of encrypted data. A migration platform processes a master key associated with the source database to decrypt an envelope key associated with the data to be migrated. The migration platform also retrieves a master key associated with the target database and encrypts the envelope key based on the master key associated with the target database.

19 Claims, 9 Drawing Sheets

100

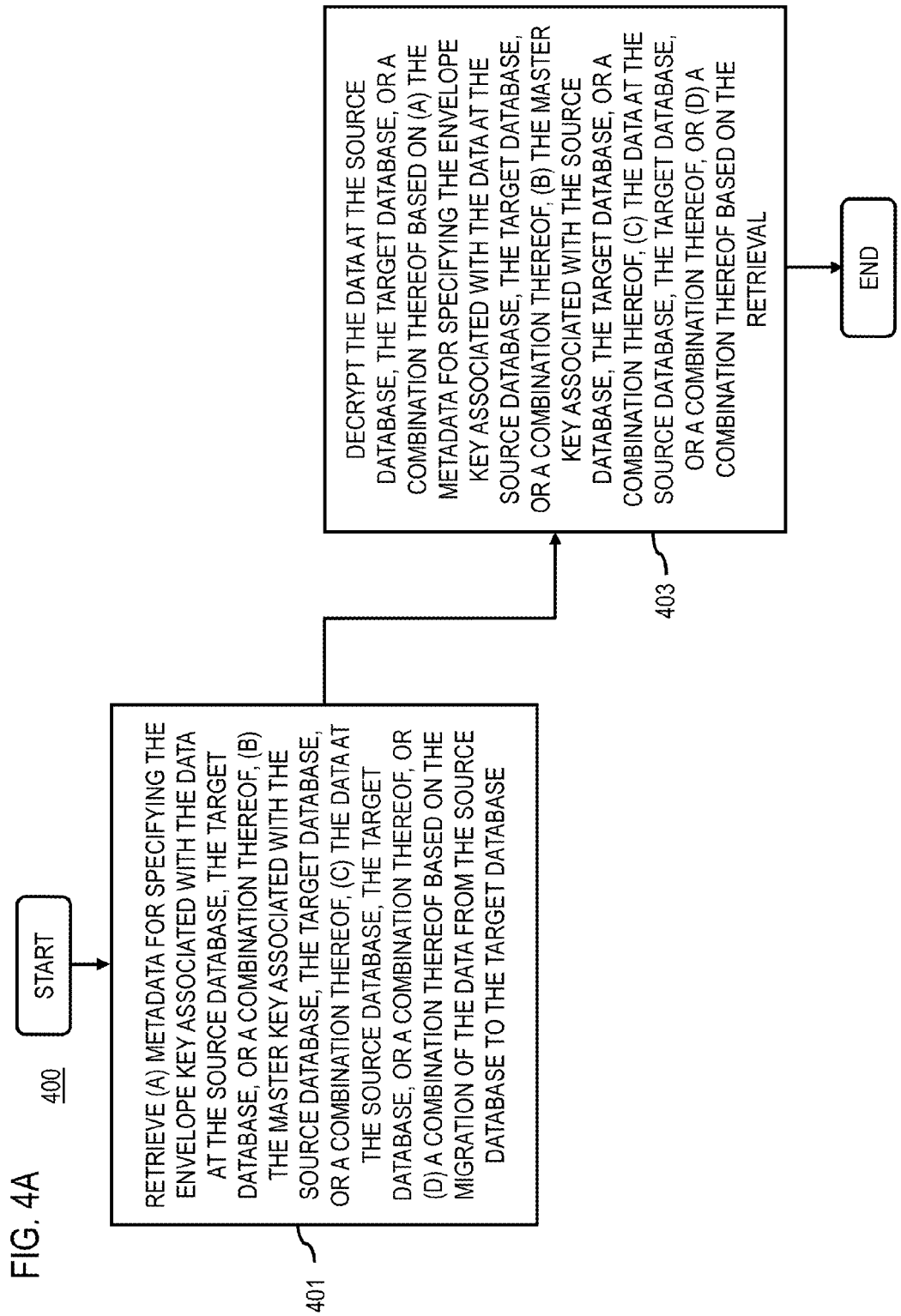

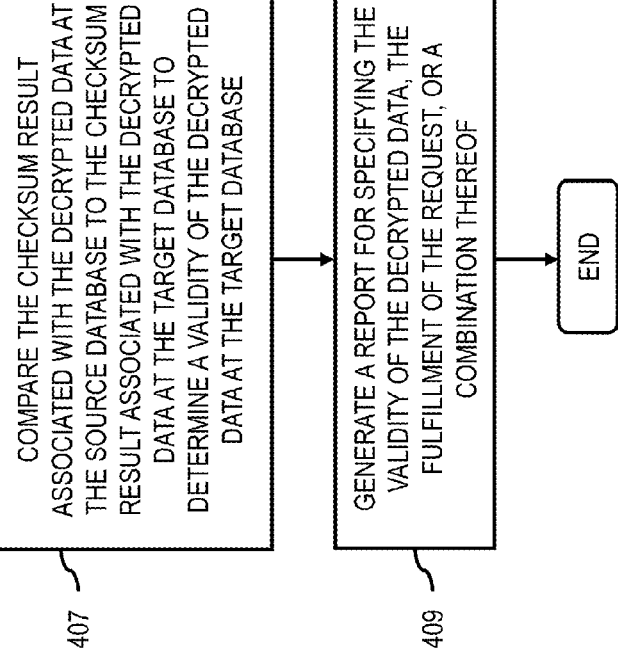

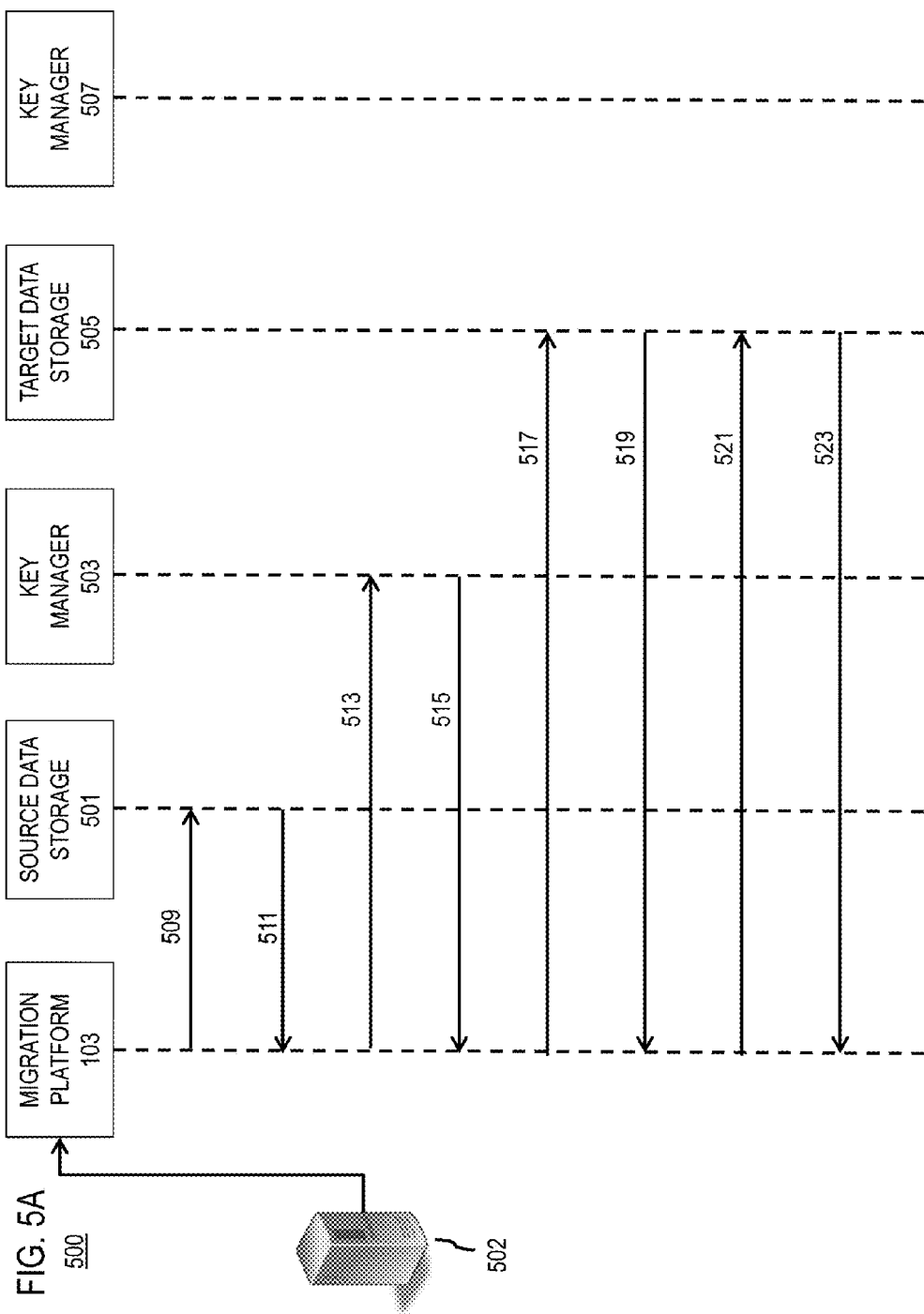

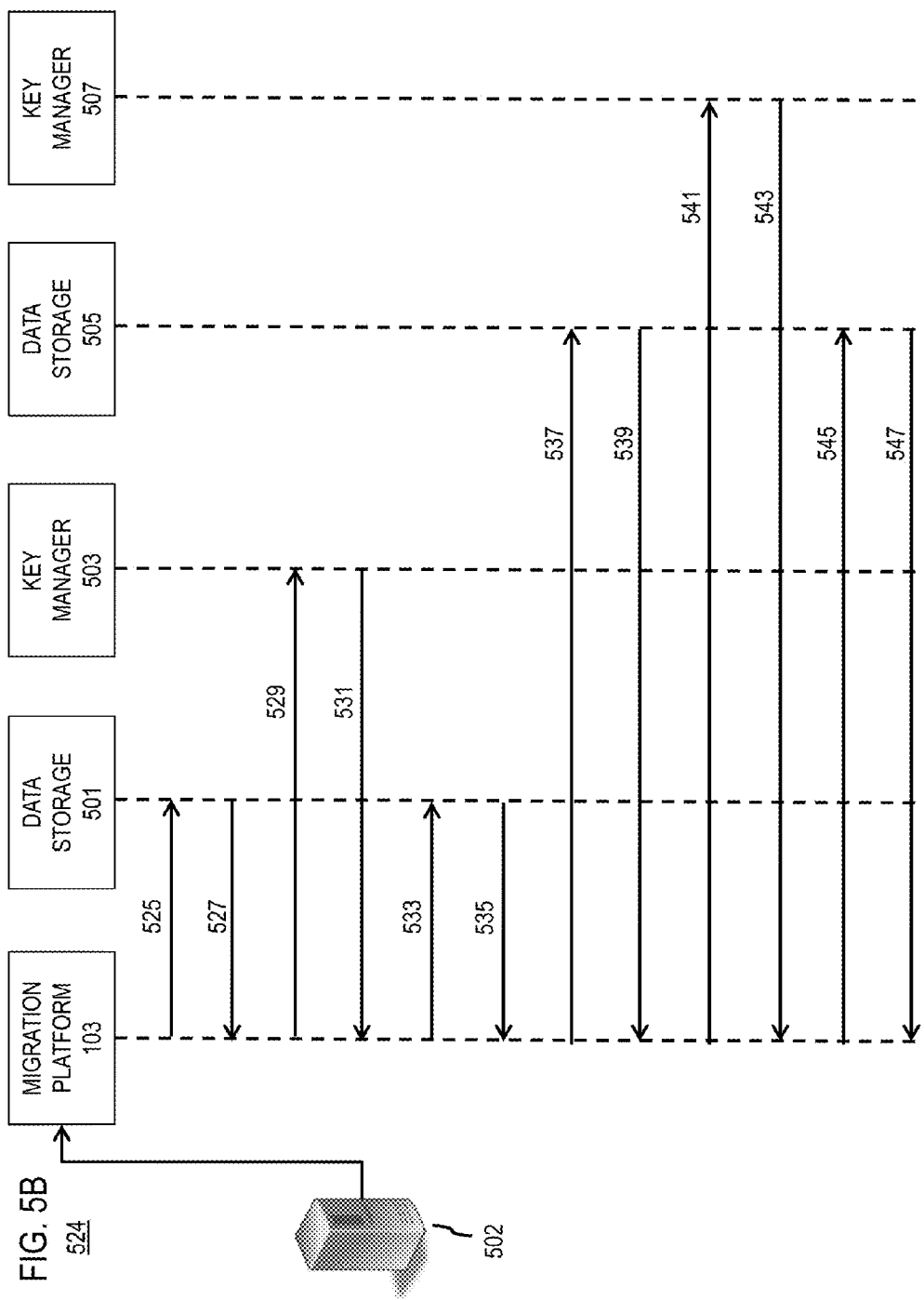

METHOD AND APPARATUS FOR MIGRATING ENCRYPTED DATA

BACKGROUND

Service providers and device manufacturers (e.g., wireless, cellular, etc.) are continually challenged to deliver value and convenience to consumers by, for example, providing compelling network services. One area of interest has been enabling customers to efficiently migrate historical data, especially encrypted data, from a source database to a target database. Typical approaches to migrating large amounts of encrypted data involve decrypting the data prior to transmission, transmitting the decrypted data to the target storage medium, then re-encrypting it at the source database. Unfortunately, each encryption procedure increases the amount of time required for transferring the data. Moreover, this approach is resource intensive and may be further impeded by network latency issues. There is currently no efficient means of migrating large amounts of encrypted data

Some Example Embodiments

Therefore, there is a need for an approach for managing the migration of large amounts of encrypted data.

According to one embodiment, a method comprises determining the submission of a request to migrate data from a source database to a target database based on the execution of one or more threads for fulfilling the request. The method also comprises processing and/or facilitating a processing of a master key associated with the source database to decrypt an envelope key associated with the data to be migrated. The method also comprises retrieving a master key associated with the target database. The method further comprises encrypting the envelope key based on the master key associated with the target database.

According to another embodiment, an apparatus comprises at least one processor, and at least one memory including computer program code for one or more computer programs, the at least one memory and the computer program code configured to, with the at least one processor, cause, at least in part, the apparatus to determine the submission of a request to migrate data from a source database to. The apparatus is also caused to process and/or facilitate a processing of a master key associated with the source database to decrypt an envelope key associated with the data to be migrated. The apparatus is also caused to retrieve a master key associated with the target database. The apparatus is further caused to encrypt the envelope key based on the master key associated with the target database.

According to another embodiment, a computer-readable storage medium carries one or more sequences of one or more instructions which, when executed by one or more processors, cause, at least in part, an apparatus to determine the submission of a request to migrate data from a source database to. The apparatus is also caused to process and/or facilitate a processing of a master key associated with the source database to decrypt an envelope key associated with the data to be migrated. The apparatus is also caused to retrieve a master key associated with the target database. The apparatus is further caused to encrypt the envelope key based on the master key associated with the target database.

According to another embodiment, an apparatus comprises means for determining the submission of a request to migrate data from a source database to. The apparatus also comprises means for processing and/or facilitating a processing of a master key associated with the source database to decrypt an envelope key associated with the data to be migrated. The apparatus also comprises means for retrieving a master key associated with the target database. The apparatus further comprises means for encrypting the envelope key based on the master key associated with the target database.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the user device side or in any shared way between service provider and user device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3B and 4A-4B are flowcharts of processes for managing the migration of large amounts of encrypted data, according to various embodiments;

FIG. 5A is a ladder diagram for depicting the interaction of the exemplary elements of the system of FIG. 1 for migrating encrypted data, according to one embodiment;

FIG. 5B is a ladder diagram for depicting the interaction of the exemplary components of the system of FIG. 1 for validating the migration of encrypted data, according to one embodiment;

DESCRIPTION OF SOME EMBODIMENTS

Examples of a method, apparatus, and computer program for managing the migration of large amounts of encrypted data according to one embodiment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "data migration" refers to any procedure for transferring information from a source database to destination database remotely. For the purpose of illustration herein, this may include the migrating of data from a dedicated server or cluster thereof, a cloud based storage medium, or any other collection network resources for maintaining and storing data.

Figure 1:
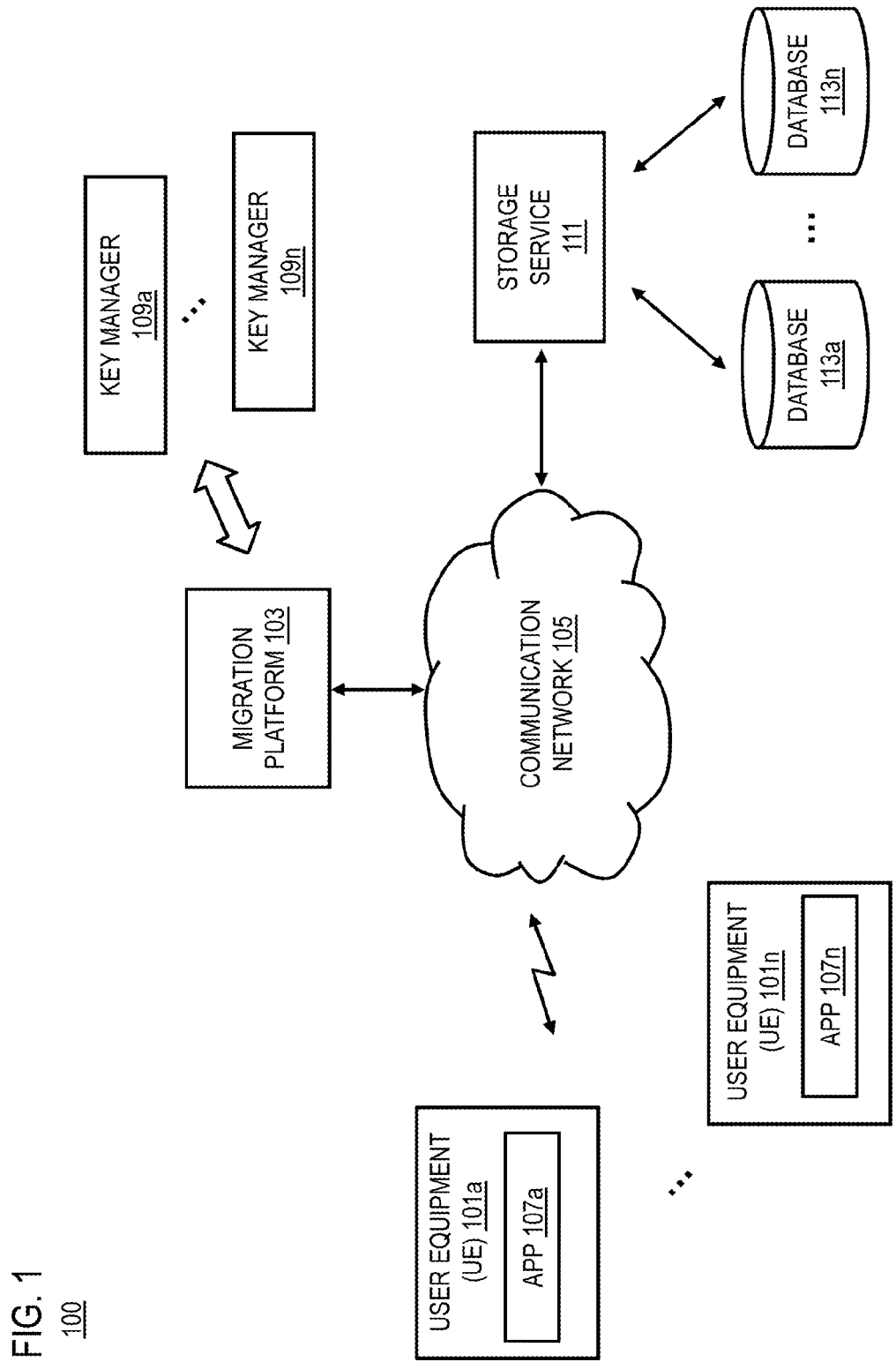
FIG. 1 is a diagram of a system for managing the migration of large amounts of encrypted data, according to one embodiment.

FIG. 1 is a diagram of a system for managing the migration of large amounts of encrypted data, according to one embodiment. In one embodiment, the system 100 includes a migration platform 103 that is configured to interact with a storage service 111. The storage service may be an enterprise or third-party resource, a web service, a server cluster or any other storage solution for maintaining large amounts of data on behalf of a user. For example purposes herein, the storage service may be directly or indirectly managed and/or implemented by the user. Hence, the exemplary embodiments herein contemplate both managed or subscriber based database storage services 111.

As noted previously, users of such services may be required to migrate large amounts of historical data from one storage medium to another. This need may arise as due to the need to replicate data, share resources across an organization, provision one or more business units or users with certain datasets, etc. In some instances, this data may be encrypted (e.g., within the database).

Typical approaches to migrating large amounts of encrypted data involve decrypting the data prior to transmission. Once decrypted, the data is then transmitted to the target storage medium via a communication network 105. Finally, depending on the requirements of the user, the data is then once again re-encrypting for storage at the target database. Unfortunately, this is both time and resource intensive. Furthermore, network transmission or latency issues can further compound the migration effort. There is currently no efficient means of migrating large amounts of encrypted data from a source database to a target database. Furthermore, there is a need for a solution that reduces the number of processing steps required to fulfill a migration request.

To address this problem, a system 100 of FIG. 1 introduces the capability for a user to manage the migration procedure required for transferring large amounts of encrypted data. In one embodiment, the migration platform 103 may be configured as a hosted solution, as an operating component of UE 101a-101n, or a combination thereof for performing the one or more of the following tasks: (1) determine the submission of job requests and associated requirements thereof to be executed (fulfilled) as one or more tasks for migrating one or more datasets; (2) initiate the execution or one or more threads for operating in parallel for carrying out the one or more tasks; (3) reduce the amount of encrypting and/or decrypting of data required for carrying out the one or more tasks; and (4) determine the validity of the data as migrated to ensure data integrity and fulfillment of the migration job request. In addition, the migration platform 103 may execute various application programming interfaces (APIs) for facilitating interaction with the storage service 111 accordingly as well as an applications 107a-107n of the UE 101a-101n for performing the aforementioned executions.

In one embodiment, the UE 101a-101n, referred to herein collectively as UE 101, may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may enable network connectivity to the migration platform 103 via a communication network 105. In addition, the UE 101 may operate applications 107a-107n, referred to herein as application 107, for initiating the submission of job requests to the migration platform 103. The job requests may specify one or more instructions, procedures or criteria to be carried out for migrating a set of data. This may include, for example, a specification of the name and/or location of the source database and the target database, the location of the data and/or reference information for the data within the source database, data quantity or type information, unique key information or a combination thereof. Additional conditions and/or constraints may also be specified, including bandwidth usage limits, time of completion limits, etc.

While not described expressly herein, it is noted that the application 107 may render a user interface to a display of the UE 101 for supporting user access to the migration platform 103. Under this scenario, the user interface may include various user controls, i.e., buttons, menus and data entry options, for enabling a user to specify one or more of the above described instructions, procedures or criteria. In addition the application 107 may feature various executions for subscribing to and/or logging into the migration platform 103 for submitting jobs (i.e., those requiring the migration of data).

In one embodiment, the migration platform 103 receives and processes job requests submitted via the application 107 of UE 101. By way of example, the migration platform 103 determines the requirements associated with the request, including the specified instructions, procedures and/or criteria, then determines the necessary resources for fulfilling the request. In addition, the migration platform 103 maintains an execution queue for managing the order and/or priority of execution of a given job. Jobs may be queued by the migration platform 103 based on the requirements as well as the current availability and resource and processing capabilities of the servers, databases, etc., involved in the migration. As such, a job pool may be maintained by the migration platform 103 for scheduling and coordinating the execution of all of the jobs submitted by users of different UE 101.

For example, in the case where a job involves migrating data maintained at a first database 113a (located at a first geographic location A) to a second database 113n (located at a second geographic location B), the migration platform 103 may perform an analysis procedure to determine the ability and/or availability of the storage service 111. Still further, the availability and/or accessibility of one or more key management systems (KMS), referred to herein as key managers 109a-109n, may be determined. In addition, current jobs queued as well as various network conditions—i.e., traffic rates, bandwidth conditions—may also be accounted for in order to determine optimal resource use and allocation. It is noted that this analysis may be performed directly by the migration platform 103 or in conjunction with the storage service 111. In the case of the former, the migration platform 103 may employ any known resource allocation or capacity planning techniques.

Still further, in one embodiment, the migration platform 103 may divide a job into one or more tasks to be executed. Under this scenario, each task may correspond to a particular execution required to be carried out for fulfilling the job request. In the case of the migrating of encrypted data, for example, this may include tasks for encrypting and/or decrypting data, which may further require the retrieval and/or processing of cryptographic key information or the like from various sources. Another task may include the performing of a checksum or other data validation procedure. Ultimately, fulfillment of a job request as submitted per the application 107 is based on fulfillment of the individual tasks.

In one embodiment, the migration platform 103 may be configure to support multithreaded execution of various tasks. By way of example, the migration platform 103 may feature a thread pool executor for assigning one or more threads to each of the one or more tasks. The one or more tasks may further be maintained via a task queue, wherein the number of threads associated with a given task is based on the number of tasks to be fulfilled, the maximum number of allowable tasks, etc. It is noted that the thread pool executor may be implemented by way of any known multithreaded programming language or interface execution, including Java or JVM. As such, the migration platform 103 may execute tasks (or subtasks) concurrently in order to make optimal use of the available resources of the UE 101 and/or storage service 111. Still further, in the case where the resources required to perform the migration employ multiple central processing units (CPUs), the multithreaded execution further extends the multitasking and resource sharing capability of said resources. This translates into reduced time and resource usage being required for performing the migration.

In one embodiment, the migration platform 103 may also be configured to execute specific instructions for interacting with a storage service 111. For example, in the case where the source database 113a and target database 113n are associated with a common web service provider, the migration platform 103 may execute the required web service interface routines. Under this scenario, the migration platform 103 may retrieve the most up-to-date application programming interfaces (APIs) based on the requirements set forth during submission of the job request. This may include accessing a software developer toolkit or running an API update agent related to the specific storage service 111 provider periodically or on demand. In the case of the latter, the access or updating may be performed in response to the submission of a job for specifying a particular storage service 111 or database type.

It is noted, therefore, that the migration platform 103 may be implemented to operate in connection with any known storage services 111 (e.g., Amazon S3, Google Cloud Storage, Rackspace Cloud Storage). Furthermore, the migration platform 103 may operate in accordance with any known database architectures/models—i.e., to accommodate different data object types, storage types, naming conventions, definitions, etc. As such, the migration platform 103 may support the translation of data conforming to one type or model for a source database into that conforming to the target database accordingly for fulfilling a migration request.

In addition to supporting multithreaded task execution, the migration platform 103 also reduces time and resource usage by managing the encryption/decryption process. In one embodiment, instead of decrypting the data to be migrated prior to transmission, the migration platform 103 is configured to only decrypt a digital envelope in which the data is encrypted. For the purpose of illustration, the digital envelop may correspond to a container for encrypting (enclosing/protecting) the data to be migrated using both secret key and public key cryptography methods. The secret key may be used to encrypt and decrypt the data, while the public key may be used to send the secret key to a requesting party (e.g., the storage service 111) via the communication network 105.

In certain instances, the data is encrypted with the digital envelope symmetric key and this envelope key is then further encrypted using a master key stored by a key manager 109a-109n, referred to herein collectively as key manager 109. The migration platform 103 is configured to interact with the key manager 109 in order to retrieve and/or upload encryption keys accordingly. A different key manager 109 may be associated with the different databases for security purposes. So, for example, the encryption keys for data maintained by the source database 113a may be maintained by a first key manager 109a while the keys for the data as stored to the target database 113n may be maintained by a second key manager 109n. The encrypted digital envelope key—as encrypted via the master key—is thus stored to the corresponding key manager as metadata (e.g., "x-provider_name-meta-x-provider_name-key"). This metadata is further stored to the key manager 109 alongside a data object conforming to the type of storage service 111 in which the data is maintained. In addition, other metadata (e.g., "x-provider_name-meta-x-provider_name-matdesc" for describing the encryption materials used for the encryption) may also be specified in order to enable the identification of keys.

Under this scenario, the migration platform 103 retrieves the master key generated for and maintained by the key manager (e.g., 109a) associated with the source database 113a, according to one embodiment. In addition, the migration platform 103 retrieves the master key maintained by the key manager (e.g., 109n) associated with the target database 113n. Once retrieved, the migration platform 103 then decrypts the encrypted envelope key using the retrieved master key associated with the source database 113a then re-encrypts the envelope key using the master key associated with the target database 113n. Hence, the envelope key for maintaining/enclosing/encrypting the original dataset is caused to be associated with the target database 113 accordingly.

Per this approach, the migration platform 103 does not have to decrypt the data at the source database 113a then re-encrypt the data again for storage to the target database 113n. Rather, the data remains encrypted with the original envelope key (digital envelope). The encryption/decryption tasks to be carried out for fulfilling the job request are only performed upon the envelop key rather than upon the dataset to be migrated. Only the re-encrypted envelop key, and not the original data itself, is transmitted to the target database for fulfilling the migration. It is noted that this execution, which may be performed as a multithreaded/concurrent procedure, may present various advantages.

In one advantage, performance of the encryption/decryption processes on the envelope key (digital envelope) only reduces the overall time required to migrate data from a source to a target database. Similarly, the amount of processing and/or machine resources required to be used or allocated to perform the migration is minimized.

As another advantage, certain of the encryption/decryption procedures, key retrieval and identification procedures and other tasks required to perform the migration may be executed in parallel as one or more threads. The one or more threads may operate in parallel for transferring encrypted data and unencrypted data along with the prepared metadata. Again, this execution enhances the rate of data transfer as well as reduces the use of the resources required to for migrating the data. By way of example, terabytes of data stored at the source database 113a may be migrated to a target database 113n within a few hours as opposed to several hours/days.

Still further, the parallel execution further enables rapid re-generating of data object values for increasing the storing of the migrated data. As such, in the case where a data object specifies a key value, version information, object access control information, object resource information, or a combination thereof for defining the object data and/or metadata at the target database; these values may be adapted rapidly. For example, the value of a date partition as structured by date for the migrated data may be updated readily from that specified per the source database to that required for the target.

As another advantage, the migration platform 103 enables automated execution of runnable jobs as submitted via the application 107. Per this approach, the migration platform 103 can readily retrieve and decrypt the metadata envelop key using the fetched dataset asymmetric key (master key as maintained by the source key manager) and re-encrypt the envelop key using the final public asymmetric key (as maintained by the target key manager).

In one embodiment, once the data is migrated (per re-encryption of the envelope key with the key associated with the target database), the migration platform 103 may further validate the integrity of the data as transferred. The validation includes, for example, the generating of a report for specifying the overall data migration results along with all successful and/or failed data objects. By way of example, the migration platform 103 streams (e.g., downloads/retrieves) and subsequently decrypts the dataset stored to the source database 113a using the encryption keys stored by respective key management systems (e.g., 109-109n) associated with the source and target databases. This may include, for example, retrieving the envelop key for decrypting the data within the digital envelope as well as retrieving the master key used to encrypt the digital envelope per the key manager associated with the source database 113a. Once the data set is decrypted, the migration platform 103 then executes a message-digest algorithm (MD5) or other cryptographic data/hash function against the data, resulting in generation of checksum values. The migration platform 103 may also maintain a data map for specifying a checksum value in connection with specific data objects as migrated.

The above described procedure is also performed against the data as stored to the target database. Under this scenario, the envelop key for decrypting the data and the master key maintained by the key manager associated with the target database 113a are retrieved. Once the data set is decrypted, the migration platform 103 then generates a checksum value for the decrypted dataset. Having generated different checksum values, corresponding to the data at the source database and the other the target database, the migration platform 103 then compares the results to determine their affinity. Matching checksum values between respective data objects indicates the validity/integrity of the data object as migrated while a discrepancy indicates a failed or invalid migration of said object (e.g., dataset).

It is noted that performance of the validation procedure by the migration platform 103 subsequent to the migration procedure offer various advantages. In one advantage, the effectiveness of the approach of decrypting/encrypting the envelope key as opposed to the data may be validated. As another advantage, with large amounts (e.g., petabytes) of data are being migrated, computing the checksum in connection with the mapping of the data enables invalid data objects to be readily identified. This may reduce the time (i.e., from months to a few days) and cost required for verifying large amounts of data.

The communication system 105 of system 100 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UE 101, migration platform 103 and cluster based service 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
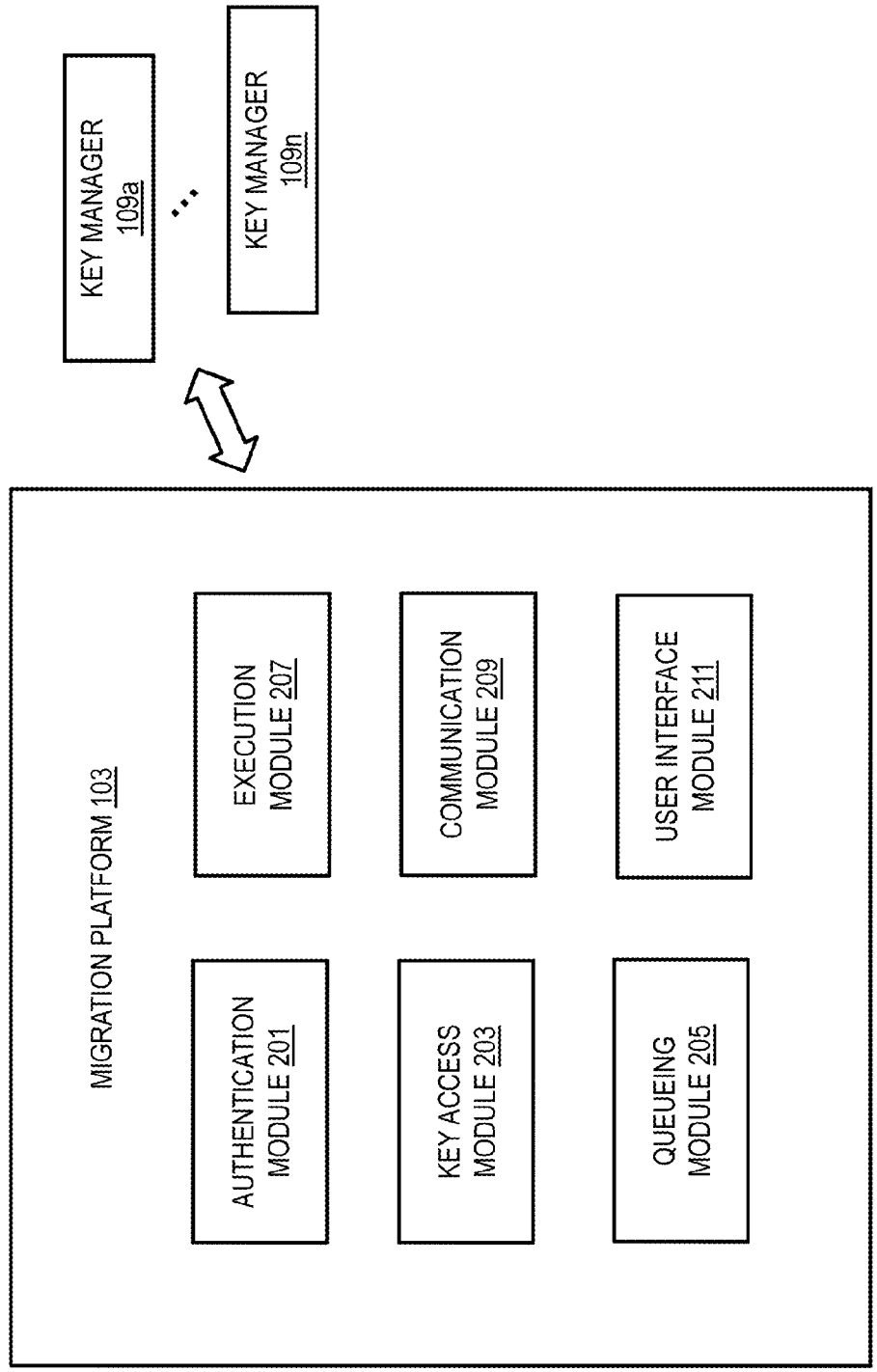
FIG. 2 is a diagram of the components of a migration platform, according to one embodiment.

FIG. 2 is a diagram of the components of a migration platform, according to one embodiment. By way of example, the migration platform 103 includes one or more components for managing the migration of large amounts of encrypted data. It is contemplated that the functions of these components may be combined in one or more components or performed by other components of equivalent functionality.

An authentication module 201 authenticates users and UE 101 for interaction with the migration platform 103. In the case of an initial accessing of the migration platform 103, a registration procedure may be performed. The registration may include facilitating the downloading of the application 107 to the UE of the user. Furthermore, the user and/or UE may establish a profile with the migration platform 103.

The authentication module 201 may also receive a job request involving the migrating of data from a source database to a target database. Requests may be received from the application 107 and processed to determine the requirements, parameters, instructions and/or constraints set forth for fulfilling the job. This may include, for example, a specification of the name and/or location of the source database and the target database, the location of the data and/or reference information for the data within the source database, data quantity or type information, unique key information or a combination thereof. Additional conditions and/or constraints may also be specified, including bandwidth usage limits, time of completion limits, etc.

A key access module 203 operates in connection with the communication module 209 to retrieve keys from the key manager 109. The key managers 109 may be a service utilized by the user for maintaining encryption keys generated for use by requesting programs and applications. Under this scenario, the keys are requested by the key access module 203 in response to the execution of a migration task/job request by the execution module 207. In addition to retrieving keys, the key access module 203 may be called upon by the execution module 207 to generate keys, such as in in the case where an envelope key (digital envelope) for encompassing data to be migrated is to be re-encrypted utilizing a master key corresponding to the target database. Furthermore, the key access module 203 may be called upon by the execution module 207 to decrypt keys, such as in the case where an envelope key is to be decrypted utilizing a master key associated with a key manager corresponding to the source database.

A queueing module 205 receives a notice from the authentication module 201 of incoming jobs to be performed and queues the jobs accordingly. This includes, for example, identifying and/or breaking the jobs up into various executable tasks. In addition, the queuing module 205 operates in connection with the execution module 207 to maintain a task queue for coordinating the sequence and/or order of execution of tasks. Within the context of a multi-parallel processing environment, the execution module 207 supports the execution of multiple threads, thereby assigning one or more threads to each of the one or more tasks that are queued. It is further noted that the execution module 207 may operate in connection with the authentication module 201 to determine the job requirements as well as interact with the storage service 111 to determine its current status, in order to determine the assignment of threads. Per this approach, the execution module 207 may receive necessary conditional feedback for optimizing allocation of resources and sequence of execution of various tasks.

The execution module 207 also initiates the various tasks to be performed in conjunction with the queueing module 205 and key access module 203, including the retrieval of keys, the decrypting and re-encrypting of digital envelopes, the transmission of said digital envelopes over the communication network via the communication module 209, etc. Still further, the execution module 207 performs validation of the migrated data as stored to the target database. This may include, for example, executing a message-digest algorithm (MD5) or other cryptographic data/hash function against the data (e.g., each data object), resulting in generation of checksum values. The migration platform 103 may also maintain a data map for specifying a checksum value in connection with the specific data objects as migrated. Consequently, the execution module 207 may perform a comparison of the pre and post migration data to validate the integrity of the migration of data from the source to the target database accordingly.

A communication module 209 enables formation of a session over a network 105 between the migration platform 103 and the application 107, the key manager 109 and the storage service 111. By way of example, the communication module 213 executes various protocols and data sharing techniques for enabling collaborative execution between a UE 101 (e.g., mobile devices, laptops, smartphones, tablet computers, desktop computers) and the migration platform 103 over the network 105. Still further, the communication module 211 may be configured to retrieve application programming interfaces and other data tools required for enabling the migration platform to interact with a specific storage service.

A user interface module 211 enables presentment of a graphical user interface for interacting with the migration platform via the UE 101. Under this scenario, the user interface may include various user controls, i.e., buttons, menus and data entry options, for enabling a user of UE 101 to submit jobs (i.e., those requiring the migration of data). The user interface module 215 may interact with the communication module 209 for supporting the generation and display of graphics primitives, the submission of input, etc., via the application 107.

The above presented modules and components of the migration platform 103 can be implemented in hardware, firmware, software, or a combination thereof. While the migration platform 103 may be implemented as a platform or hosted for interacting with UE 101, it is also contemplated that it may be implemented for direct operation by respective UE 101a-101n. Per this approach, some of the executions of the above described components may be performed at the UE 101a-101n, wherein the migration platform 103 generates direct signal inputs by way of the operating system of the UE 101 for interacting with the storage service. The exemplary embodiments herein may correspond to any of these implementations.

Figure 6:
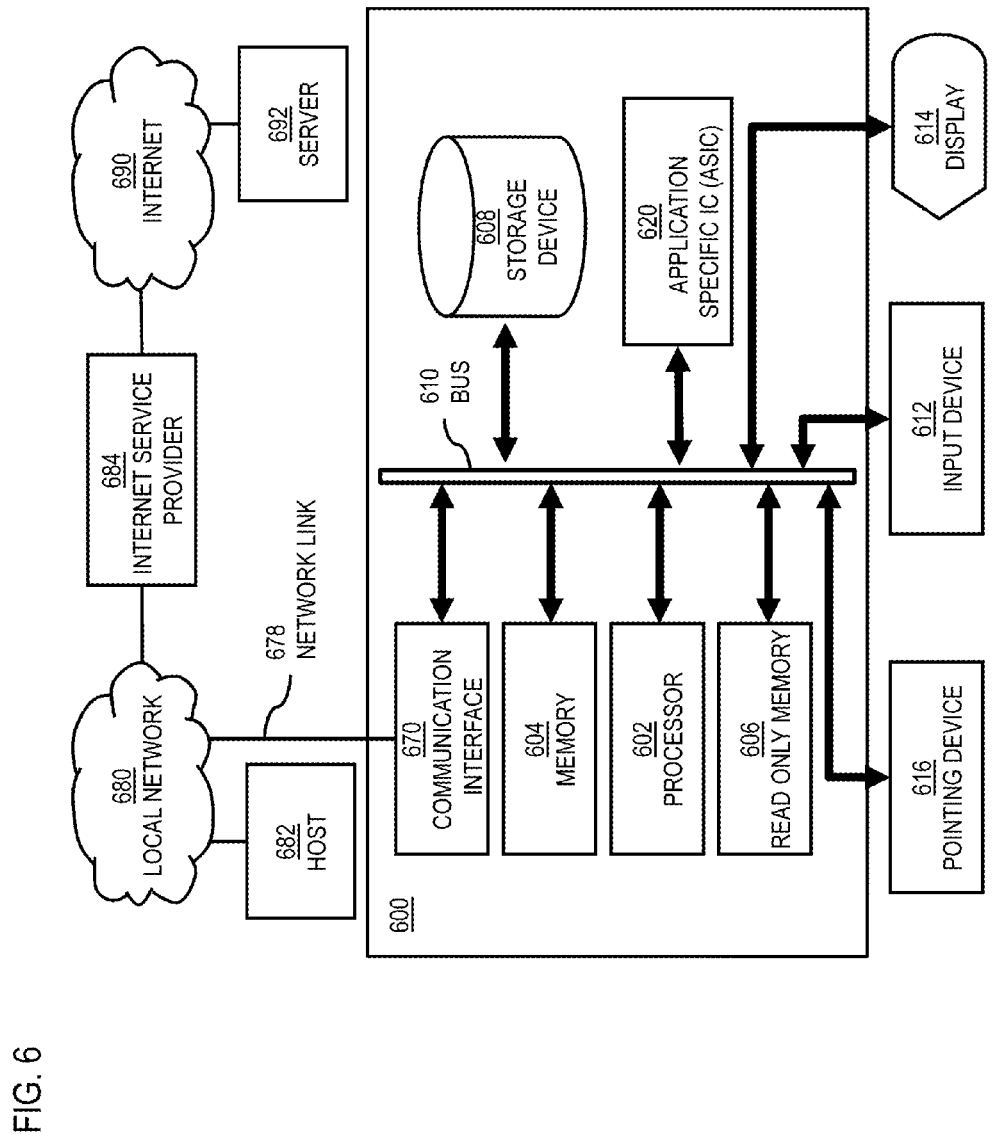
FIG. 6 is a diagram of hardware that can be used to implement an embodiment of the invention.

FIGS. 3A-3C and 4A and 4B are flowcharts of processes for managing the migration of large amounts of encrypted data, according to various embodiments. In one embodiment, the migration platform 103 performs the processes and is implemented in, for instance, a chip set including a processor and a memory as shown in FIG. 6.

In step 301 of process 300 (FIG. 3A), the migration platform 103 determines the submission of a request to migrate data from a source database to a target database based on the execution of one or more threads for fulfilling the request. As noted, the request may be submitted by way of the application 107 of the UE 101. In another step 303, the platform 103 processes and/or facilitates a processing of a master key associated with the source database to decrypt an envelope key associated with the data to be migrated. As noted previously, the master key associated with the source database may be that corresponding to the original/old key manager 109.

In steps 305, the migration platform 103 retrieves a master key associated with the target database. In addition, the platform retrieves the master key associated with the source database based on the request. In another step 307, the platform 103 encrypts the envelope key based on the master key associated with the target database. As noted previously, per this approach, the encrypting of the envelope key with the master key of the target database corresponds to an associating of the original data with the keys of the target database and key manager. This association of the data with the target is achieved without requiring a decrypting of the original dataset to be migrated.

In step 309 of process 308 (FIG. 3B), the migration platform 103 migrates the data from the source database to the target database based on the encryption of the envelope key, the execution of the one or more threads, or a combination thereof. Hence, the one or more threads may perform the migration of the data or sets thereof concurrently. Per step 311, the platform 103 stores the encrypted envelope key to the target database in association with at least one data object. The migration of the data is based on the storing of the data, wherein the storing of the data conforms to the encryption requirements of the target database. As mentioned previously, the at least one data object may include (a) the data, the metadata, or a combination thereof, (b) a key value, version information, object access control information, object resource information, or a combination thereof associated with the target database, or (c) a combination thereof. It is further noted that data objects may vary from one storage service 111 to another.

Figure 3B:
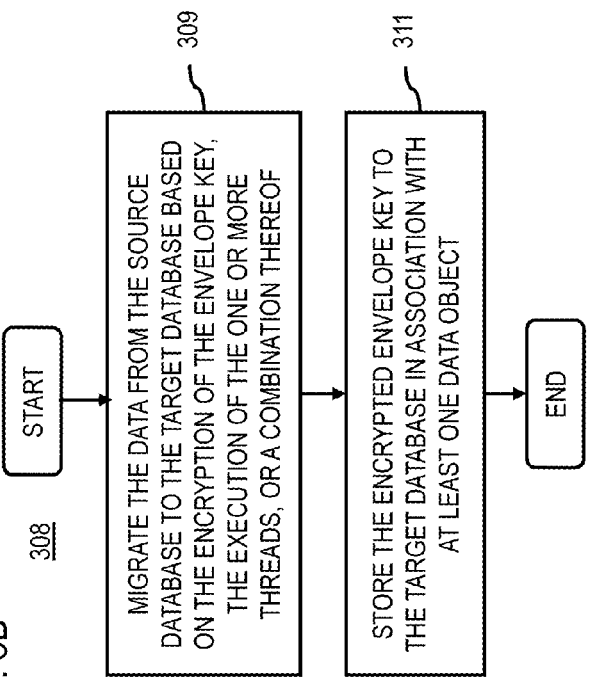
Figure 3A:
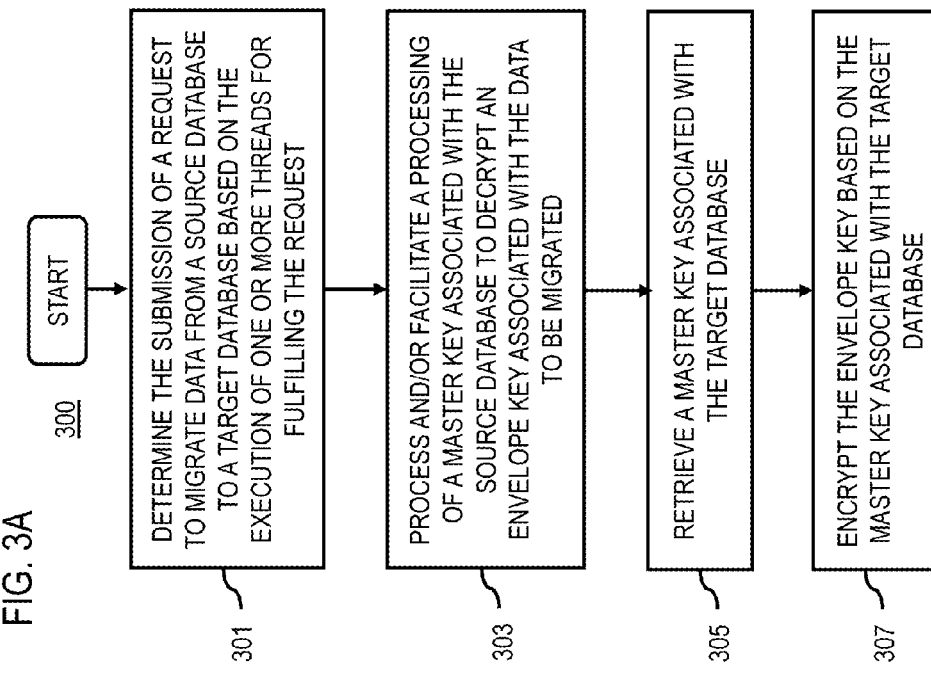

In FIGS. 4A and 4B, the migration platform 103 performs various validation procedures for determining the effectiveness of the data migration steps of FIGS. 3A and 3B. Per step 401 of process 400, the platform 103 retrieves (a) metadata for specifying the envelope key associated with the data at the source database, the target database, or a combination thereof, (b) the master key associated with the source database, the target database, or a combination thereof, (c) the data at the source database, the target database, or a combination thereof, or (d) a combination thereof based on the migration of the data from the source database to the target database. In step 403, the migration platform 103 decrypts the data at the source database, the target database, or a combination thereof based on (a) the metadata for specifying the envelope key associated with the data at the source database, the target database, or a combination thereof, (b) the master key associated with the source database, the target database, or a combination thereof, (c) the data at the source database, the target database, or a combination thereof, or (d) a combination thereof based on the retrieval.

In step 405 of process 404 (FIG. 4B), the migration platform 103 determines (a) a checksum result to associate with the decrypted data at the source database, a checksum result to associate with the decrypted data at the target database, or a combination thereof based on a validation procedure, (b) a data map associated with the decrypted data at the source database, a data map associated with the decrypted data at the target database, or a combination thereof, or (c) a combination thereof. As mentioned, the validation procedure may be performed according to any known validation techniques.

In another step 407, the migration platform 103 compares the checksum result associated with the decrypted data at the source database to the checksum result associated with the decrypted data at the target database to determine a validity of the decrypted data at the target database. As noted, this corresponds to a comparison of the respective data objects as migrated from a pre and post migration perspective; thus enabling the migration platform 103 to validate the integrity of the migration of data from the source to the target database accordingly. Per step 409, the platform 103 generates a report for specifying the validity of the decrypted data, the fulfillment of the request, or a combination thereof. In the case of invalidity errors, the report may specify the specific data objects that are invalid per the data mapping results.

FIG. 5A is a ladder diagram for depicting the interaction of the exemplary elements of the system of FIG. 1 for migrating encrypted data, according to one embodiment. The elements of the system include, for example, the migration platform 103, a source data storage 501 and associated key management system (key manager 503). Also included is a target data storage 505 and associated key management system (key manager 507). A server device 502 is configured to interact with the migration platform 103 by way of an application for submitting job requests. Hence, the interaction between respective elements of the system includes various steps 509-523.

Once a job request involving the migration of data from the source data storage 501 to the target data storage is submitted, the migration platform 103 invokes the execution of various tasks and/or corresponding threads. This includes, for example, retrieving the original data encryption metadata from the source database corresponding to steps 509 and 511. In another step 513, the migration platform 103 generates a request to retrieve the decryption key from the original key manager 503. By way of example, the request may be initiated as a REST API call for transmission as a hypertext transfer protocol message. The key manager 503 then returns the key as requested, per step 515.

In step 517, the migration platform 103 retrieves the new encryption public key as stored in the target data storage 505. In response to the request, the target data storage 505 then returns the key as requested, per step 519. Alternatively, the key may be acquired from the key manager 507 associated with the target data storage 505 (not shown).

In step 521, the migration platform 103 re-encrypts the envelop key (digital envelop) and copies the data with the re-encrypted key metadata to the target data storage 505. In response, the target data storage 505 species that the new data with the re-encrypted envelope key metadata is successfully stored in the target data storage 505; corresponding to step 523. It is contemplated, in certain embodiments, that the migration platform 103 may further generate a message to the user interface of the application 524 for indicating completion of the data migration task.

In FIG. 5B, the migration platform 103 initiates a data verification process against the migrated data by first requesting the downloading of the original data encryption metadata, per step 525. The data storage 501 then returns this data to the migration platform 103 per step 527 and the platform 103 further submits a request to retrieve the original master key from the key manager 503 associated with the original data storage 501 per step 529. In step 531, this data is then returned to the platform 103. It is noted that the request may be initiated as a REST API call for transmission as a hypertext transfer protocol message.

In step 533, the migration platform 103 also downloads and decrypts the data using the original master key maintained by the key manager 503. In another step 535, the downloaded data (as enveloped) is then decrypted and processed by way of a validation procedure. This may include, for example, execution of a MD5 checksum against the data along with mapping of the data according to any known data mapping techniques.

In steps 537, the migration platform 103 requests a downloading of the newly migrated data encryption metadata. The data storage 505 then returns this data to the migration platform 103 per step 539 and the platform 103 further submits a request to retrieve the new master key from the key manager 507 per step 541. In step 543, this data is then returned to the platform 103 by the key manager 507. It is noted that the request may be initiated as a REST API call for transmission as a hypertext transfer protocol message.

In step 545, the migration platform 103 also downloads and decrypts the data using the original master key maintained by the key manager 503. In another step 547, the downloaded data (as enveloped) is then decrypted and processed by way of a validation procedure. This may include, for example, execution of a MD5 checksum against the data along with mapping of the data according to any known data mapping techniques.

Pursuant to calculation of the checksum procedures corresponding to steps 535 and 547, the migration platform 103 may further compare the results to determine if any invalid results occurred. The results may be further rendered to a display of the requesting service 502 for reporting the results of the migration. Results may include a message for indicating fulfillment of the job, the completion of specific tasks associated with the job, the migrating of specific data or portions thereof, the comparison results, etc. In addition, the data map may be reported for indicating which data objects if any have discrepancies.

The processes described herein for managing the migration of large amounts of encrypted data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to manage the migration of large amounts of encrypted data as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of managing the migration of large amounts of encrypted data.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to manage the migration of large amounts of encrypted data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for managing the migration of large amounts of encrypted data. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for managing the migration of large amounts of encrypted data, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for managing the migration of large amounts of encrypted data to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
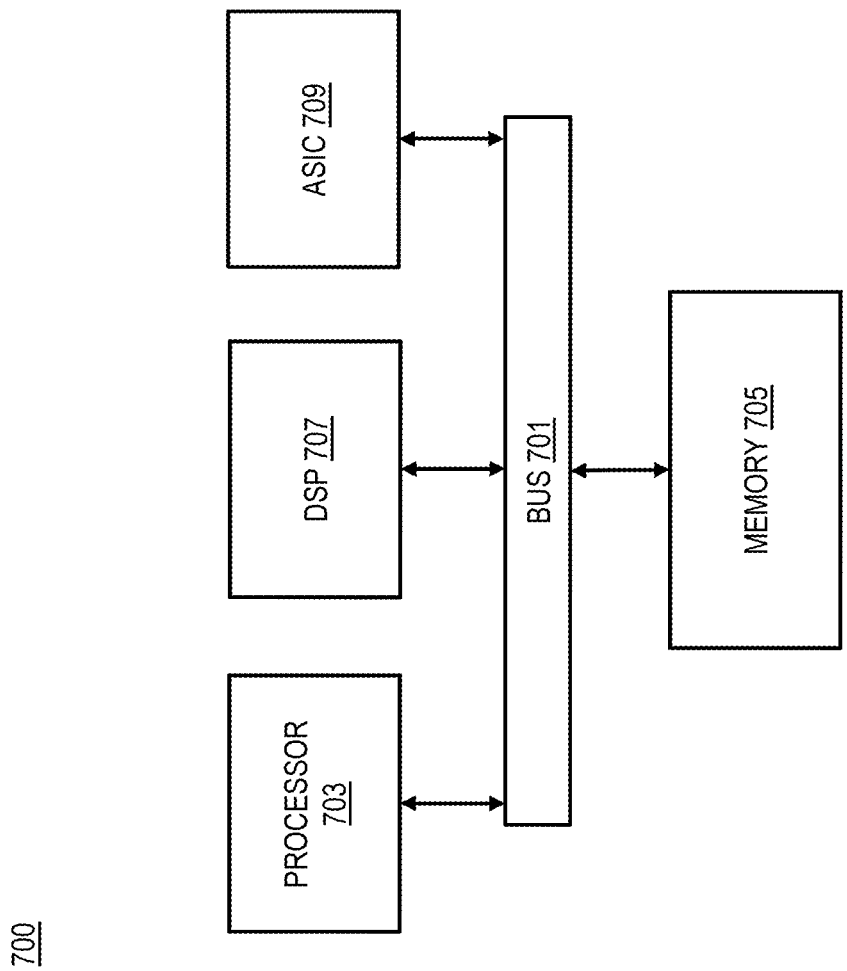
FIG. 7 is a diagram of a chip set that can be used to implement an embodiment of the invention.

FIG. 7 illustrates a chip set or chip 700 upon which an embodiment of the invention may be implemented. Chip set 700 is programmed to manage the migration of large amounts of encrypted data as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of managing the migration of large amounts of encrypted data.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor.

Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to manage the migration of large amounts of encrypted data. The memory 705 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for migrating encrypted data from a source database associated with a first master key to a target database associated with a second master key comprising:
   determining a submission of a request to migrate the data from the source database to the target database based on an execution of one or more threads for fulfilling the request, wherein the data is encrypted using an envelope key specific to the data, and wherein the envelope key is encrypted using the first master key associated with the source database;
   decrypting the envelope key associated with the data to be migrated using the first master key associated with the source database;
   retrieving the second master key associated with the target database; and
   re-encrypting the decrypted envelope key using the second master key associated with the target database;
   fulfilling the request to migrate the data by transmitting the re-encrypted envelope key to the target database without transmitting the data; and
   retrieving (a) metadata for specifying the envelope key associated with the data at the source database, the target database, or a combination thereof, (b) the first master key, (c) the second master key, (d) the data at the source database, the target database, or a combination thereof, or (e) a combination thereof based on the migration of the data from the source database to the target database.

2. A method of claim 1, further comprising:
   causing, at least in part, a migration of the data from the source database to the target database based on the encryption of the envelope key using the second master key.

3. A method of claim 1, further comprising:
   storing the envelope key encrypted using the second master key to the target database in association with at least one data object,
   wherein a migration of the data is based on the storage and the envelope key encrypted using the second master key is specified as metadata.

4. A method of claim 3, wherein the at least one data object includes (a) the data, the metadata, or a combination thereof, (b) a key value, version information, object access control information, object resource information, or a combination thereof associated with the target database, or (c) a combination thereof.

5. A method of claim 1, further comprising:
   retrieving the first master key associated with the source database based on the request,
   wherein the first master key is maintained by a key management system associated with the source database, a device that submits the request, or a combination thereof.

6. A method of claim 1, wherein the second master key associated with the target database is maintained by a key management system associated with the target database, a device that submits the request, or a combination thereof.

7. A method of claim 1, wherein the request is associated with one or more tasks, a task queue, or a combination thereof.

8. A method of claim 1, further comprising:
   causing, at least in part, a decryption of the data at the source database, the target database, or a combination thereof based on (a) the metadata for specifying the envelope key associated with the data at the source database, the target database, or a combination thereof, (b) the first master key, (c) the second master key, (d) the data at the source database, the target database, or a combination thereof, or (e) a combination thereof based on the retrieval; and
   determining (a) a checksum result to associate with the decrypted data at the source database, a checksum result to associate with the decrypted data at the target database, or a combination thereof based on a validation procedure, (b) a data map associated with the decrypted data at the source database, a data map associated with the decrypted data at the target database, or a combination thereof, or (c) a combination thereof.

9. A method of claim 8, further comprising:
   comparing the checksum result associated with the decrypted data at the source database to the checksum result associated with the decrypted data at the target database to determine a validity of the decrypted data at the target database; and
   causing, at least in part, a generating of a report for specifying the validity of the decrypted data, the fulfillment of the request, or a combination thereof.

10. An apparatus for migrating encrypted data from a source database associated with a first master key to a target database associated with a second master key comprising:
    at least one processor; and
    at least one memory including computer program code for one or more programs,
    the at least one memory and the computer program code configured to, with the at least one processor, cause the apparatus to perform at least the following,
        determine a submission of a request to migrate the data from the source database to the target database based on an execution of one or more threads for fulfilling the request, wherein the data is encrypted using an envelope key specific to the data, and wherein the envelope key is encrypted using the first master key associated with the source database; and decrypt the envelope key associated with the data to be migrated using the first master key associated with the source database;

retrieve the second master key associated with the target database; and encrypt the decrypted envelope key using the second master key associated with the target database;

fulfill the request to migrate the data by transmitting the re-encrypted envelope key to the target database without transmitting the data; and retrieve (a) metadata for specifying the envelope key associated with the data at the source database, the target database, or a combination thereof, (b) the first master key, (c) the second master key, (d) the data at the source database, the target database, or a combination thereof, or (e) a combination thereof based on the migration of the data from the source database to the target database.

11. An apparatus of claim 10, wherein the apparatus is further caused to:

cause, at least in part, a migration of the data from the source database to the target database based on the encryption of the envelope key using the second master key.

12. An apparatus of claim 10, wherein the apparatus is further caused to:

store the envelope key encrypted using the second master key to the target database in association with at least one data object, wherein the migration is based on the storage and the envelope key encrypted using the second master key is specified as metadata.

13. An apparatus of claim 12, wherein the at least one data object includes (a) the data, the metadata, or a combination thereof, (b) a key value, version information, object access control information, object resource information, or a combination thereof associated with the target database, or (c) a combination thereof.

14. An apparatus of claim 13, wherein the apparatus is further caused to:

retrieve the first master key associated with the source database based on the request, wherein the first master key is maintained by a key management system associated with the source database, a device that submits the request, or a combination thereof.

15. An apparatus of claim 10, wherein the second master key associated with the target database is maintained by a key management system associated with the target database, a device that submits the request, or a combination thereof.

16. An apparatus of claim 10, wherein the request is associated with one or more tasks, a task queue, or a combination thereof.

17. A computer-readable storage medium for migrating encrypted data from a source database associated with a first master key to a target database associated with a second master key, carrying one or more sequences of one or more instructions which, when executed by one or more processors, cause an apparatus to perform:

determining a submission of a request to migrate the data from the source database to the target database based on an execution of one or more threads for fulfilling the request, wherein the data is encrypted using an envelope key specific to the data, and wherein the envelope key is encrypted using the first master key associated with the source database;

decrypting the envelope key associated with the data to be migrated using the first master key associated with the source database;

retrieving the second master key associated with the target database; and encrypting the decrypted envelope key using the second master key associated with the target database;

fulfilling the request to migrate the data by transmitting the re-encrypted envelope key to the target database without transmitting the data; and retrieving (a) metadata for specifying the envelope key associated with the data at the source database, the target database, or a combination thereof, (b) the first master key, (c) the second master key, (d) the data at the source database, the target database, or a combination thereof, or (e) a combination thereof based on the migration of the data from the source database to the target database.

18. A computer-readable storage medium of claim 17, wherein the apparatus is further caused to perform:

causing, at least in part, a migration of the data from the source database to the target database based on the encryption of the envelope key using the second master key.

19. A computer-readable storage medium of claim 17, wherein the apparatus is further caused to perform:

storing the envelope key encrypted using the second master key to the target database in association with at least one data object, wherein the migration is based on the storage and the envelope key encrypted using the second master key is specified as metadata.

* * * * *